US012207059B2

(12) United States Patent
Jin et al.

(10) Patent No.: US 12,207,059 B2
(45) **Date of Patent: *Jan. 21, 2025**

(54) APPARATUS AND METHOD FOR ESTIMATION OF EARDRUM SOUND PRESSURE BASED ON SECONDARY PATH MEASUREMENT

(71) Applicant: Starkey Laboratories, Inc., Eden Prairie, MN (US)

(72) Inventors: Wenyu Jin, Eden Prairie, MN (US); Henning Schepker, Oldenburg (DE)

(73) Assignee: Starkey Laboratories, Inc., Eden Prairie, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/408,661

(22) Filed: Jan. 10, 2024

(65) Prior Publication Data

US 2024/0205623 A1 Jun. 20, 2024

Related U.S. Application Data

(63) Continuation of application No. 18/096,961, filed on Jan. 13, 2023, now Pat. No. 11,895,467, which is a continuation of application No. 17/490,057, filed on Sep. 30, 2021, now Pat. No. 11,558,703.

(60) Provisional application No. 63/117,697, filed on Nov. 24, 2020.

(51) Int. Cl.
*H04R 29/00* (2006.01)
*H04R 25/00* (2006.01)

(52) U.S. Cl.
CPC ........... *H04R 29/00* (2013.01); *H04R 25/305* (2013.01)

(58) Field of Classification Search
CPC .............................. H04R 29/00; H04R 25/305
See application file for complete search history.

(56) References Cited

U.S. PATENT DOCUMENTS

| | | | |
|---|---|---|---|
| 9,271,666 | B2 | 3/2016 | Stirnemann |
| 10,798,517 | B2 | 10/2020 | Murata et al. |
| 11,558,703 | B2 | 1/2023 | Jin |
| 2007/0036377 | A1 | 2/2007 | Stirnemann |
| 2019/0082278 | A1 | 3/2019 | Boley et al. |
| 2020/0068337 | A1 | 2/2020 | Murata et al. |

FOREIGN PATENT DOCUMENTS

| | | |
|---|---|---|
| EP | 2323553 | 5/2011 |

OTHER PUBLICATIONS

Fabry et al., "Primary Path Estimator based on Individual Secondary Path for ANC Headphones", ICASSP, 2020, 34 pages.
Sankowsky-Rothe et al., "Prediction of the Sound Pressure at the Ear Drum in Occluded Human Ears", Acta Acustica United with Acustica, vol. 97, 2011, pp. 656-668.

(Continued)

*Primary Examiner* — Mark Fischer
(74) *Attorney, Agent, or Firm* — Mueting Raasch Group

(57) ABSTRACT

An individual cutoff frequency for an individual secondary path measurement is determined. First and second acoustic transducer-to-eardrum responses below and above the cutoff frequency are determined using an individual secondary path measurement, a reduced dimensionality estimate, and a least squares estimate. A sound pressure level at an eardrum of the user is predicted using the first and second receiver-to-eardrum responses.

20 Claims, 11 Drawing Sheets

(56) References Cited

OTHER PUBLICATIONS

Schmidt et al., "Measurement of equal-loudness contours using eardrum pressure as reference signal", Acoustics 08 Paris, 2008, pp. 3895-3900.
Vogl et al., "Individualized prediction of the sound pressure at the eardrum for an earpiece with integrate receivers and microphones", J. Acoust. Soc. Am., vol. 145 (2), Feb. 2019. pp. 917-930.
PCT Search Report and Written Opinion for PCT/US2021/052794, dated Jan. 17, 2022 (14 pages).

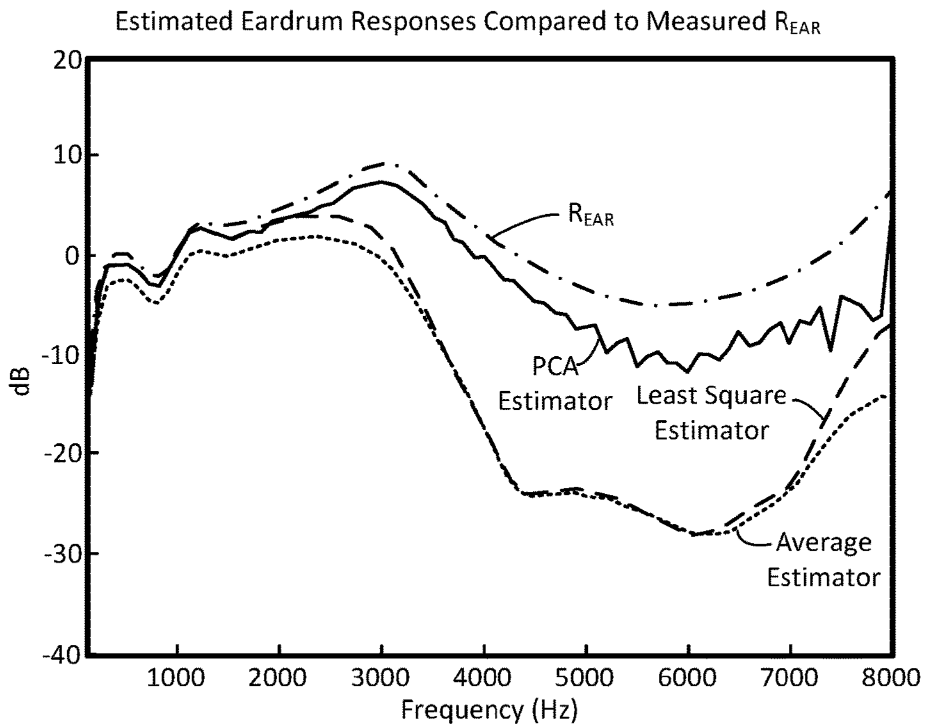

*FIG. 8*

```
f_cutoff = 1200;      % initialize the cut-off frequency
                      % point at 1.2kHz
idx = round(f_cutoff /freqResolution);
                      % freqResolution is the frequency
                      % resolution of the DFT
while (gainSPdB(idx) <
(max(gainSPdB(idx+1),gainSPdB(idx+2)) -0.1)) &&
(freqPtsSPHz(idx) < 1800);
                      % gainSPdB is the measured SP gain
                      % value in dB
     idx = idx + 1;
end
f_cutoff =freqPtsSPHz(idx);
                      % freqPtsSPHz are the frequency
                      % points of DFT of measured SP
```

*FIG. 9*

APPARATUS AND METHOD FOR ESTIMATION OF EARDRUM SOUND PRESSURE BASED ON SECONDARY PATH MEASUREMENT

RELATED APPLICATIONS

This application is a Continuation Application of U.S. patent application Ser. No. 18/096,961, filed Jan. 13, 2023, which is a Continuation Application of U.S. patent application Ser. No. 17/490,057, filed Sep. 30, 2021 and issued on Jan. 17, 2023 as U.S. Pat. No. 11,558,703, which claims the benefit of U.S. Provisional Application No. 63/117,697, filed Nov. 24, 2020, the contents of which are all incorporated by reference.

SUMMARY

This application relates generally to ear-level electronic systems and devices, including hearing aids, personal amplification devices, and hearables. For example, an apparatus and method facilitate estimation of eardrum sound pressure based on secondary path measurement. In one embodiment a method involves determining a cutoff frequency for an individual based on a secondary path measurement performed on the individual. A first acoustic transducer-to-eardrum response below the cutoff frequency is estimated using the secondary path measurement and a least squares estimate. A second acoustic transducer-to-eardrum response above the cutoff frequency is estimated using the secondary path measurement and a reduced dimensionality estimate. A sound pressure level caused by the hearing device at an eardrum of the individual is predicted using the first and second acoustic transducer-to-eardrum responses.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below makes reference to the following figures.

FIGS. 7 and 8 are graphs showing error and responses for two types of secondary path to eardrum sound pressure estimators according to an example embodiment;

FIG. 9 is a pseudocode listing of cutoff frequency calculator according to an example embodiment;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments disclosed herein are directed to an ear-worn or ear-level electronic hearing device. Such a device may include cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as "hearing aids," "hearing devices," and "ear-wearable devices"), such as hearables (e.g., wearable earphones, ear monitors, and earbuds), hearing aids, hearing instruments, and hearing assistance devices, typically include an enclosure, such as a housing or shell, within which internal components are disposed.

In recent years, hearing devices and hearables having been including both microphones and receivers in the ear canal. Inward-facing microphones and integrated receivers (e.g., loudspeakers) can provide the ability to predict the sound pressure at the eardrum. The integrated microphone and receiver can be used to better understand the acoustic transfer properties within the individual ear when the hearing devices are inserted. In this disclosure, devices, systems and methods are described that address the problem of individually predicting the sound pressure created by the receivers at the eardrum.

In some embodiments described below, sound pressure can be predicted at the eardrum by finding an estimator (e.g., a linear estimator) that maps individually measured secondary path responses to a set of predefined receiver-to-eardrum responses. The estimator can be created via offline training on a set of previously measured secondary path and receiver-to-eardrum response pairs. Experimental results based on real-subject measurement data confirm the effectiveness of this approach, even for the case when the size of database for pre-training is limited.

Figure 1:
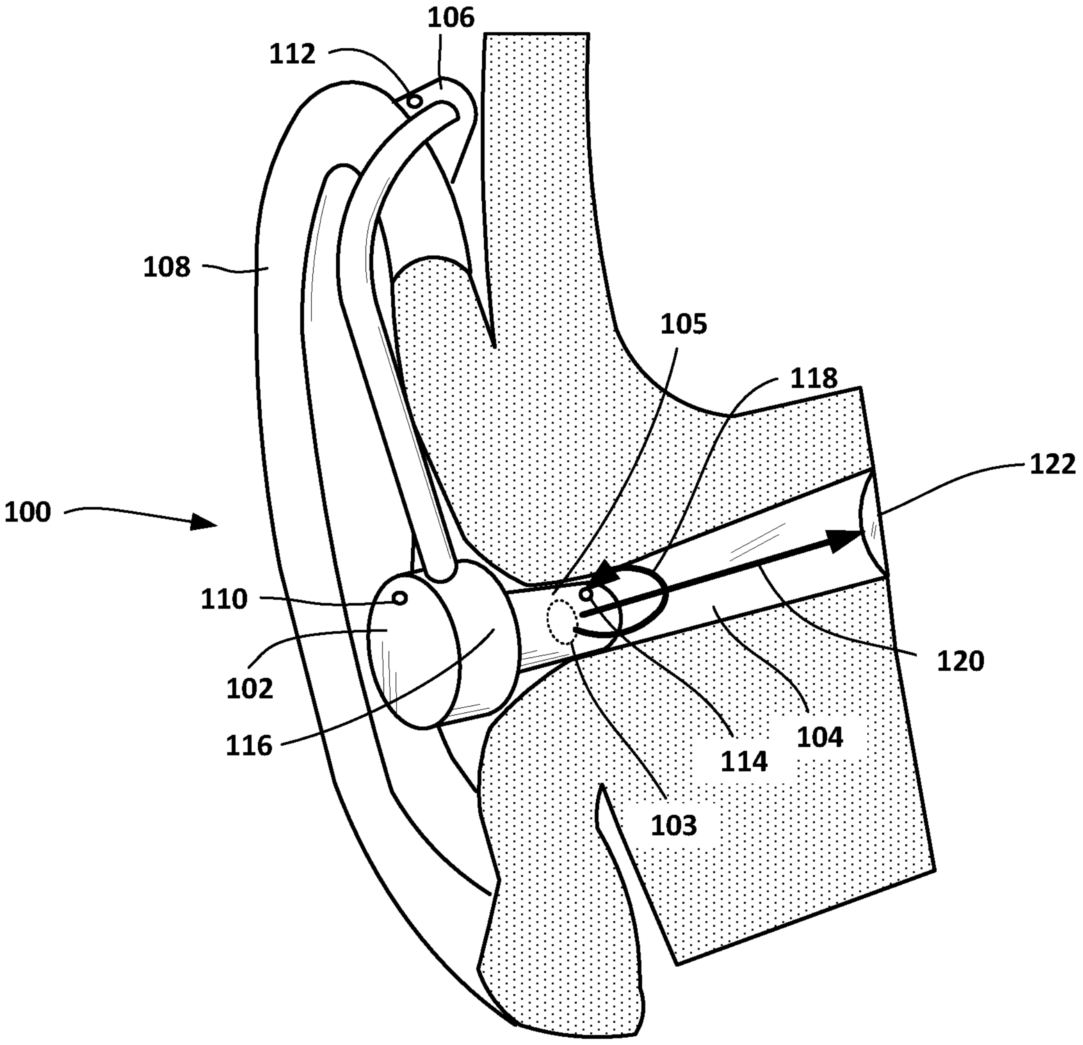
FIG. 1 is an illustration of a hearing device according to an example embodiment.

In FIG. 1, a diagram illustrates an example of an ear-wearable device 100 according to an example embodiment. The ear-wearable device 100 includes an in-ear portion 102 that fits into the ear canal 104 of a user/wearer. The ear-wearable device 100 may also include an external portion 106, e.g., worn over the back of the outer ear 108. The external portion 106 is electrically and/or acoustically coupled to the internal portion 102. The in-ear portion 102 may include an acoustic transducer 103, although in some embodiments the acoustic transducer may be in the external portion 106, where it is acoustically coupled to the ear canal 104, e.g., via a tube. The acoustic transducer 103 may be referred to herein as a "receiver," "loudspeaker," etc., however could include a bone conduction transducer. One or both portions 102, 106 may include an external microphone, as indicated by respective microphones 110, 112.

The device 100 may also include an internal microphone 114 that detects sound inside the ear canal 104. The internal microphone 114 may also be referred to as an inward-facing microphone or error microphone. For purposes of the following discussion, path 118 represents a secondary path, which is the physical propagation path from receiver 103 to the error microphone 114 within the ear canal 104. Path 120 represents an acoustic coupling path between the receiver 103 and the eardrum 122 of the user. As discussed in greater detail below, the device 100 includes features that allow estimating the response of the path 120 using measurements of the secondary path 118 made using the receiver 103 and inward-facing microphone 114.

Other components of hearing device 100 not shown in the figure may include a processor (e.g., a digital signal processor or DSP), memory circuitry, power management and charging circuitry, one or more communication devices (e.g., one or more radios, a near-field magnetic induction (NFMI) device), one or more antennas, buttons and/or switches, for example. The hearing device 100 can incorporate a long-range communication device, such as a Bluetooth® transceiver or other type of radio frequency (RF) transceiver.

While FIG. 1 show one example of a hearing device, often referred to as a hearing aid (HA), the term hearing device of the present disclosure may refer to a wide variety of ear-level electronic devices that can aid a person with impaired hearing. This includes devices that can produce processed sound for persons with normal hearing. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device" or "ear-wearable device," which is understood to refer to a system comprising a single left ear device, a single right ear device, or a combination of a left ear device and a right ear device.

The sound pressure at the eardrum due to a stimulus signal being played out via the integrated receiver, indicates the acoustic transfer properties within the individual ear when the hearing devices being inserted. It facilitates to derive control strategies to achieve individualized drum pressure equalization as well as potential self-fitting, active feedback, noise, and occlusion control. Conventionally, the sound pressure at the eardrum can be measured directly using probe-tube microphones. However, positioning a probe tube tip in the vicinity of the eardrum is a delicate task, which makes it cumbersome to be conducted in practice. Also, this technique may be subject to significant inter-subject variations due to ear-canal acoustics and re-insertions.

It is expected a large number of hearing devices will integrate both a receiver (or other acoustic transducer) and an additional inward-facing microphone in the ear canal. Apart from being used for active noise cancellation (ANC) and active occlusion cancellation (AOC) features, the inward-facing microphone also enables the possibility to predict the sound pressure at the eardrum using the integrated receiver and inward-facing microphone. Note that hearing device 100 may include a silicone-molded bud 105 that provides an effective sealing of the ear when the device 100 is inserted. Embodiments described herein address the problem of individually predicting the sound pressure created by the receiver at the eardrum when the hearing device 100 is inserted and properly fitted into the ear. More specifically, the transfer functions of the sound pressure at the eardrum 122 relative to the sound pressure measured by the inward-facing microphone 114 will be estimated individually.

Figure 2:
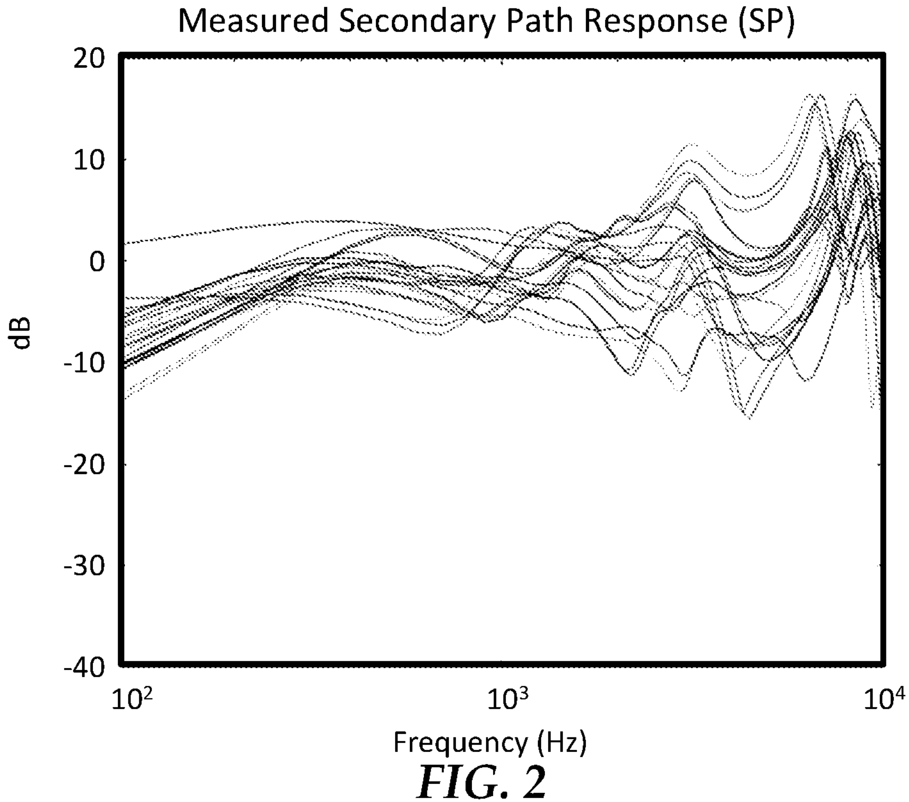
FIGS. 2 and 3 are graphs of secondary path measurements and eardrum sound pressure used for training a hearing device according to an example embodiment.
Figure 3:
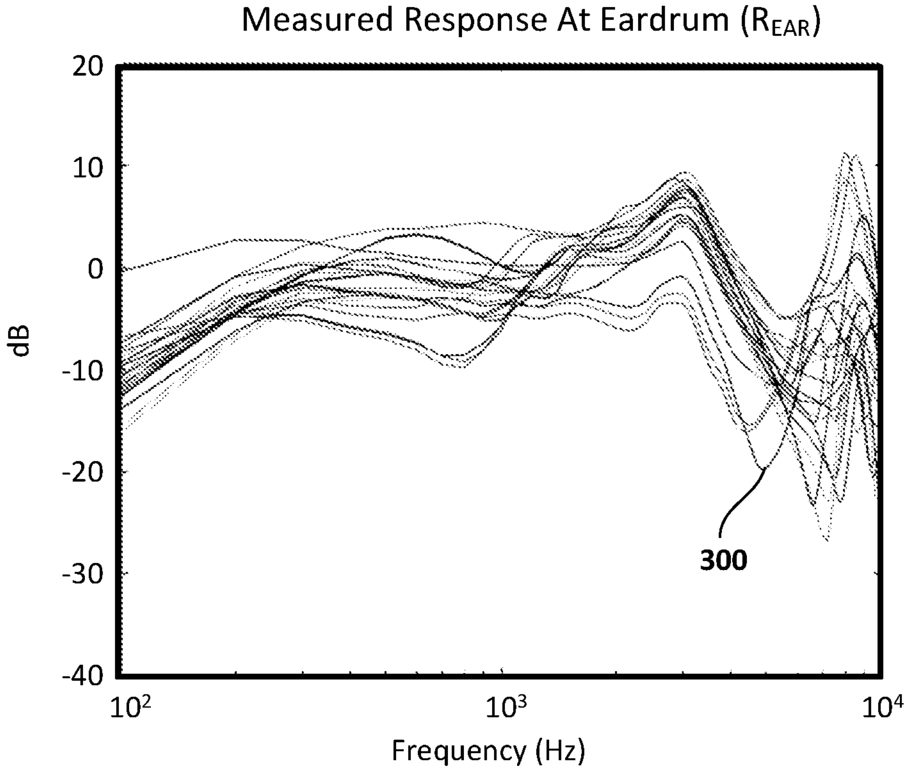
Figure 4:
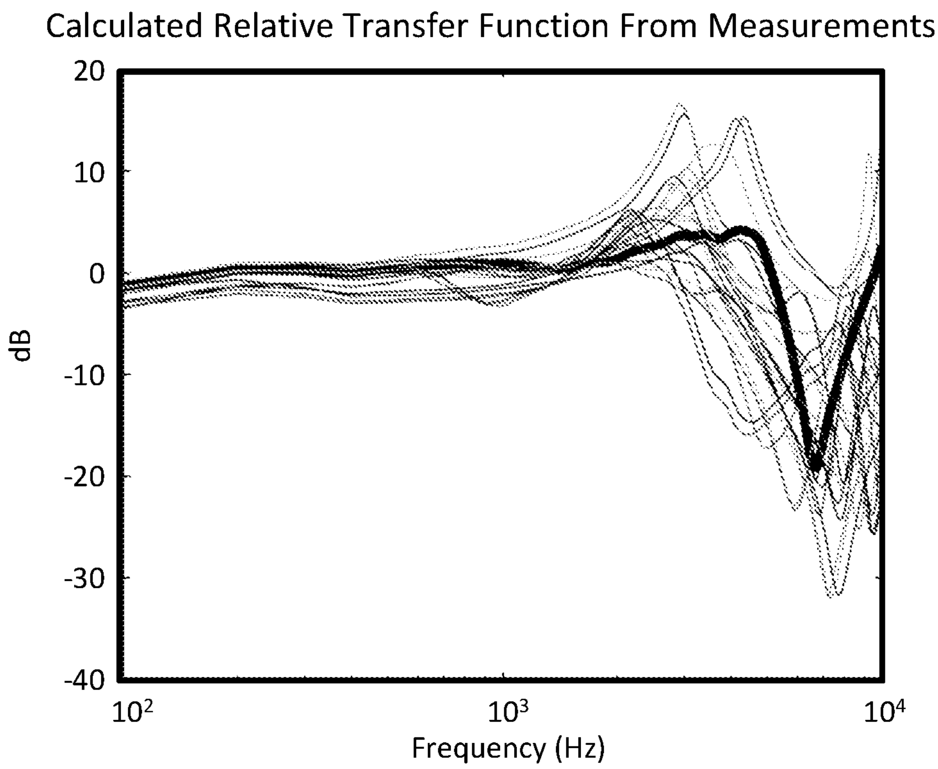
FIG. 4 is a graph showing transfer functions calculated for the curves in FIGS. 2 and 3.

In FIGS. 2, 3 and 4, graphs illustrate frequency responses obtained from a plurality of test subjects that can be used in hearing device according to an example embodiment. These graphs show acoustic measurements on ten subjects with the same hearing device. Each curve in FIG. 2 is a secondary path (SP) response that is paired with one of the eardrum response curves in FIG. 3. These figures represent 29 pairs of secondary path responses and associated eardrum responses. Each response pair was used to derive a relative transfer function (RTF), the RTF curves being shown in FIG. 4. The bold curve in FIG. 4 represents an average of the 29 calculated RTF.

Although probe-tube measurements are widely used to measure eardrum sound pressure, unwanted artifacts are known to appear in these measurements. For example, the measured responses may include quarter-wavelength notches related to standing waves, e.g., due to backward reflections. It can be difficult to enforce the measurements with fixed distance to the eardrum among different subjects, which leads to random presence of spectrum minimas at high frequencies (>5 kHz). An example of this is shown by spectrum minimum 300 in FIG. 3, which is approximately at 5 kHz. Other responses show similar minimas in this region at or above 5 kHz.

In one embodiment, the probe-tube measurements can be adjusted to compensate for these random artifacts. For example, as described in "Prediction of the Sound Pressure at the Ear Drum in Occluded Human Ears," by Sankowsky-Rothe et al. (Acta Acustica United with Acustica, Vol. 97 (2011) 656-668), a minimum at the measurement position can be compensated for by a modeled pressure transfer function from the measurement position to the eardrum. The pressure transfer function can use a lossless cylinder model, for example, and can be used to correct the probe-tube measurement data and improve the estimation performance and consistency at higher frequencies.

Figure 5:
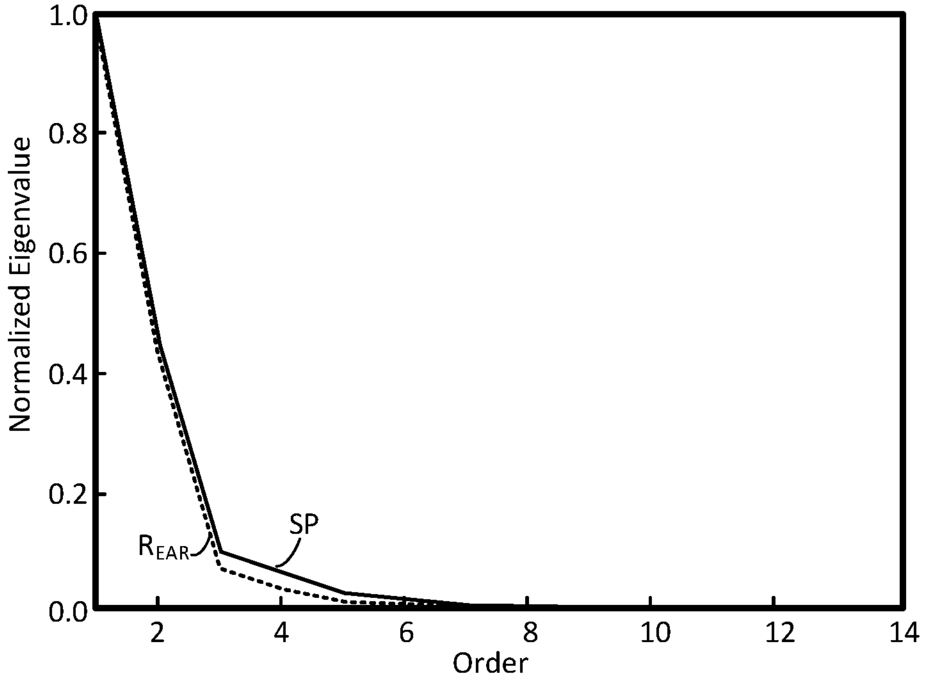
FIGS. 5 and 6 are graphs showing response characteristics used for principle component based analysis according to an example embodiment.

Embodiments described herein include an estimator for the individual acoustic transducer-to-eardrum (e.g., receiver-to-eardrum) response based on a measurement of the individual secondary path. The individual secondary path measurement is made in the ear of the target user using the user's own personal hearing device. The estimator is based on offline pre-training on a set of previously measured secondary path and receiver-to-eardrum response pairs, such as shown in FIGS. 4 and 5. Three such estimators have been investigated. The first is an average receiver-to-eardrum response, which is intuitive but not mathematically optimal. The second estimator is a least square estimator that may be globally optimized. The third estimator is a reduced dimensionality estimator such as Principal Component Analysis (PCA) based estimator. The second and third estimators are discussed in more detail below.

The least squares optimization is formulated by minimizing the cost function in Expression (1) below, where $D_{SP}$ is a diagonal matrix containing the discrete Fourier transform (DFT) coefficients of all SP responses and $D_{REAR}$ is stacked vectors containing the DFT coefficient of all receiver-to-eardrum responses. The variable $g_{gls}$ is the gain vector of the RTF and $\mu$ is a regularization multiplier to prevent the derived gain vector from being over-amplified, which may be set to a value <<1. The optimal least-square solution is derived as shown in Equation (2), where I is an identity matrix, $(\bullet)^H$ is the Hermitian transpose, and p is selected as 0.001, for example.

$$\|(D_{SP}g_{gls}) - D_{REAR}\|_2^2 + \mu\|g_{gls}\|_2^2 \quad (1)$$

$$g_{gls} = inv\left(D_{SP}^H D_{SP} + \mu I\right)D_{SP}^H(D_{REAR}) \quad (2)$$

Figure 6:
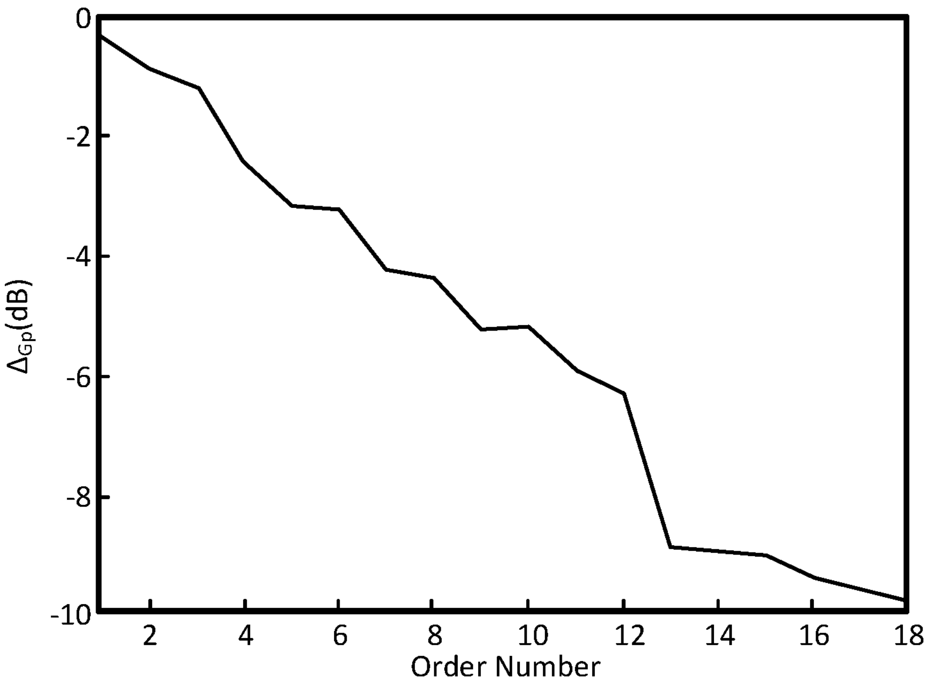

The PCA approach converts frequency response pairs into principal components domain and finds a map (e.g., a linear map) that projects the secondary path gain vectors onto the receiver-to-eardrum gain vectors in a minimum mean square error (MMSE) sense. In FIG. 5, a graph shows normalized eigenvalues of the singular value decomposition of both SP and $R_{EAR}$ responses during the PCA decay for this example. The curve in FIG. 5 implies that it is reasonable to reduce the order of components. In FIG. 6, a graph shows the estimation error for the gain vector for this example. For this data set, the order number for the PCA analysis was chosen to be 12, which means that a 12×12 linear mapping in the PC domain is used. The PCA-based estimator benefits from numerical robustness and efficiency due to the dimensionality reduction of the PCA.

Note that pressure transform function described above to adjust measured eardrum responses can be used as a preprocessing stage for the PCA-based estimator, e.g., to precorrect the spectrum notches that are presented in the probe-tube measurement data. This pre-processing can provide a better estimate of targeted eardrum response with a smooth spectrum. This pre-processing can also improve PCA-based estimator accuracy at high frequencies, e.g., above 5 kHz.

Figure 7:
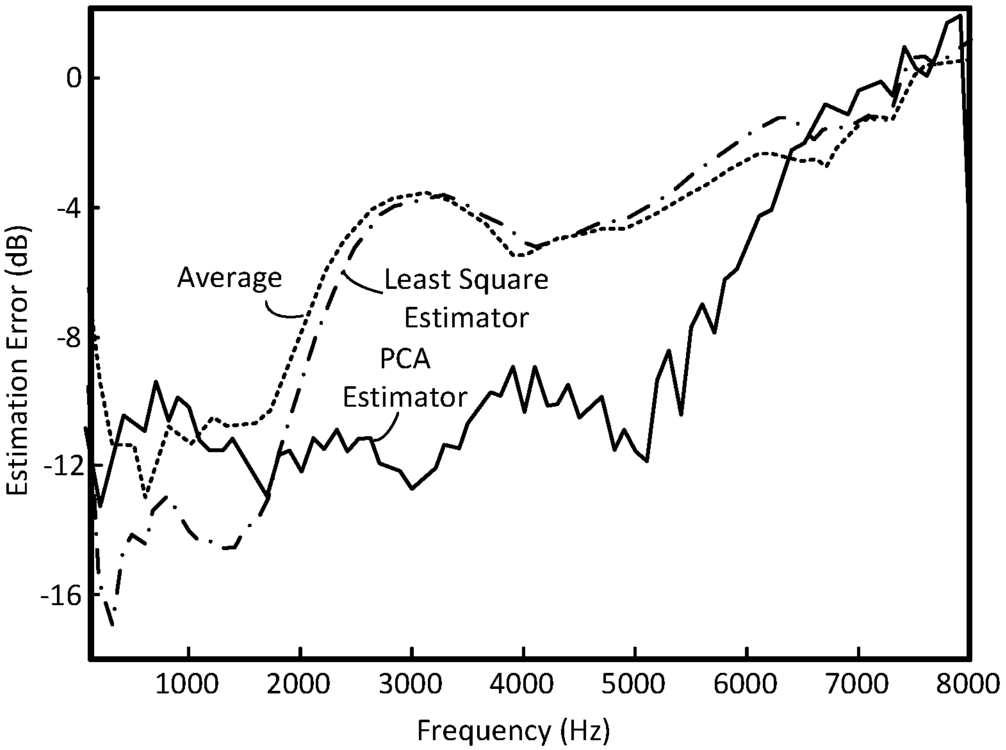

In FIG. 7, a graph showing frequency domain normalized estimation error 10 $\log((P'_{rear}-P_{rear})^2)$−10 $\log((P_{rear})^2)$ for an example selected from this data set. A repetitive leave-one-out cross-validation approach was conducted for the 29 pairs of SP and $R_{EAR}$ response pairs to obtain this type of data for the entire set. As seen in FIG. 7, there is a noticeably improved estimation performance in this example with the PCA based estimator at higher frequency ranges (e.g., up to 6 kHz in this example) compared to the least squares estimator. The PCA-based estimator is not as good as the least-square based method at lower frequencies (e.g., below around 1.5 kHz) due to that the transfer functions at low frequency regions are less affected by deterministic changes between two responses.

In FIG. 8, a graph shows an example of the application of both the least squares estimator and PCA estimator to an SP response from the data set. This is shown in comparison to the actual measured eardrum response, $R_{EAR}$. By analyzing these results, it was found that a PCA-based estimator is not as good as the least-square based method at low frequency regions due to the transfer functions being less affected by deterministic changes between two responses (SP and $R_{EAR}$). Therefore, in some embodiments a cut-off frequency is defined that separates the two estimation schemes (e.g., PCA-based estimator and least-square based method) for high/low frequency ranges and it varies among different subjects based on the individualized SP measurements The cutoff frequency may be dependent on the subject (e.g., the individual user and device) and can be determined based on a fitting of the device, e.g., a self-fitting. In one embodiment, determining the cut-off frequency $f_{cutoff}$ for each of subject may involve selecting the frequency of the first peak of measured SP gain between 1.2 kHz and 1.8 kHz (⅓ octave band segmentation). An example method of determining the $f_{cutoff}$ using this process is shown in the pseudo-code listing of FIG. 9. Generally, the pseudo-code involves stepping through each gain value of the DFT starting at 1.2 kHz. If for a selected frequency $f_i$ the gain $g_i$ is greater than or equal to the largest of the next two values minus a small offset ($\max(g_{i+1},g_{i+2})$−0.1 in this example), then $g_i$ is the first peak of the gain curve and the selected frequency $f_i$ is set as the cutoff. If the maximum frequency 1.8 kHz is encountered without finding a peak, then 1.8 kHz is set as the cutoff.

It will be understood that other procedures may be used to determine the cutoff frequency. For example, instead of looking at the next two values of the gain curve, more or fewer next values may be considered. In other embodiments, the maximum value in the frequency range (e.g., 1.2 kHz to 1.8 kHz in this example) may be selected instead of the first peak. In some embodiments, the cutoff frequency could be later changed, e.g., based on a startup process in which SP is subsequently re-measured, etc., to account for variations in fit of the device within the ear over time.

Figure 10:
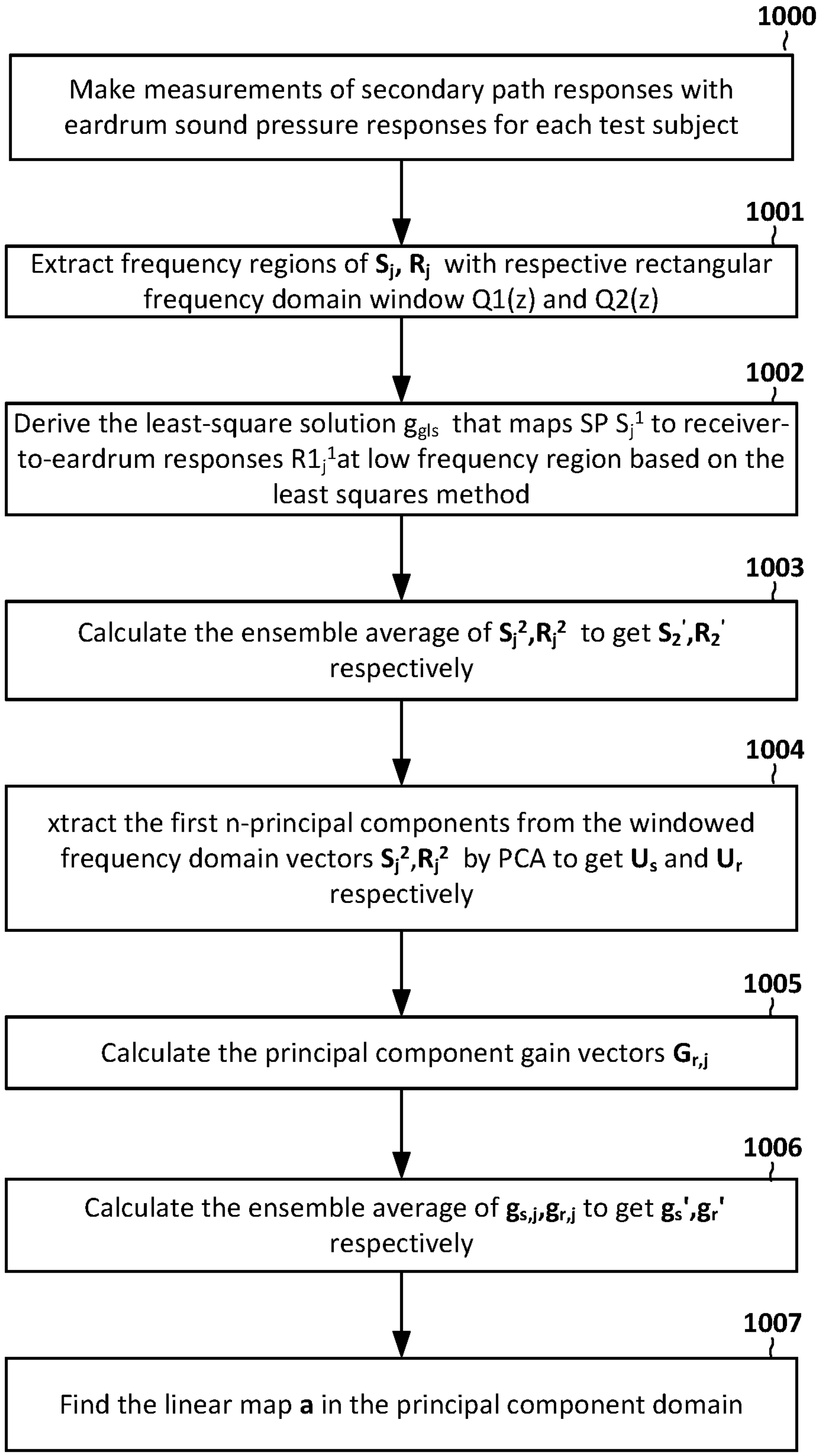
FIG. 10 is a flowchart of a method of processing training data according to an example embodiment.
Figure 11:
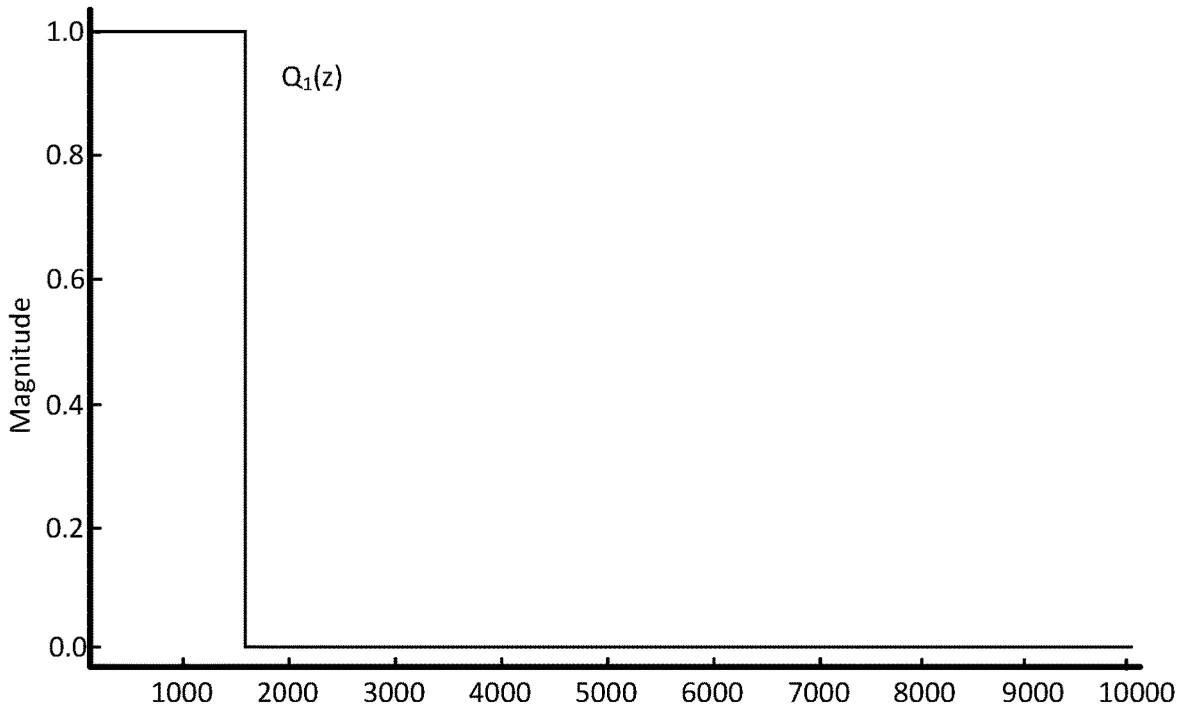
FIGS. 11 and 12 are graphs of frequency domain windows used in processing training data according to an example embodiment.
Figure 12:
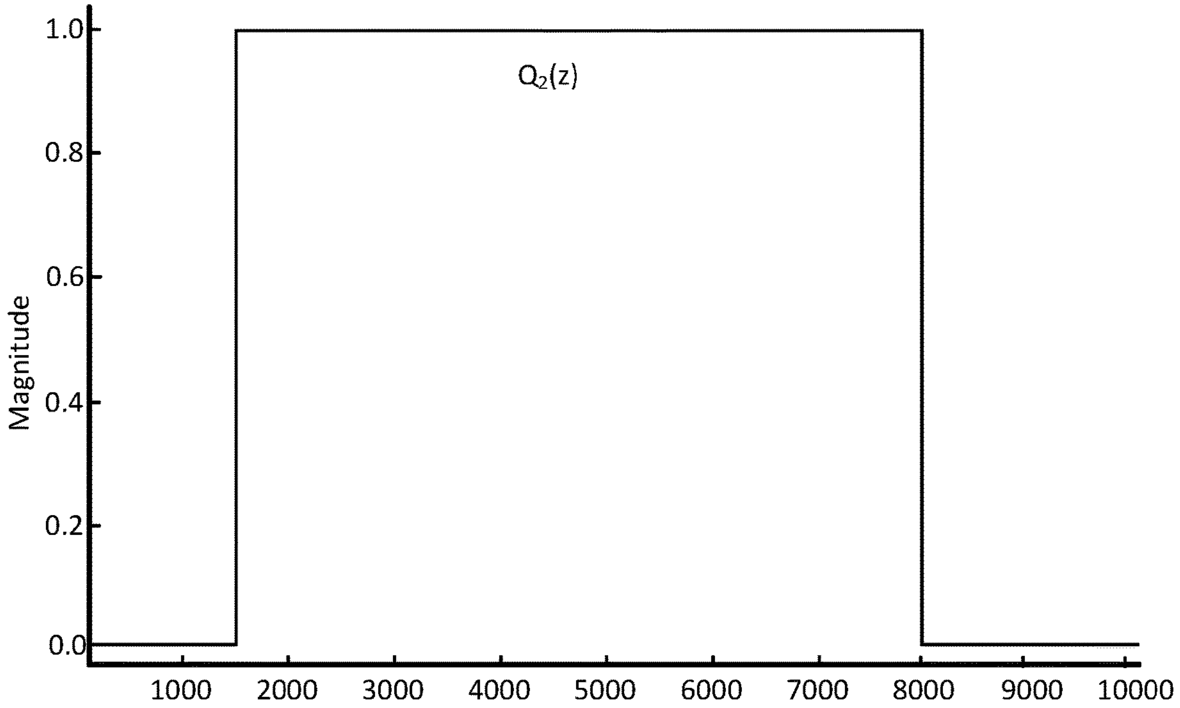

A separate training process will performed for each hearing device type/model that will utilize the $R_{EAR}$ estimation feature. The number of test subjects can be relatively small, e.g., 5-20. In FIG. 10, a flowchart shows a method for training data according to an example embodiment. Generally, for each test subjects, one or more SP response measurements 1000 are made with an associated measurement of the eardrum sound pressure response, $R_{EAR}$. Frequency regions of $S_j$, $R_j$ are extracted 1001 with respective rectangular frequency domain window $Q_1(z)$ and $Q_2(z)$, examples of which are shown in FIGS. 11 and 12. Note that FIGS. 11 and 12 assume that $f_{cutoff}$ is 1.5 kHz, however these curves could change if a different $f_{cutoff}$ is used.

The windowed frequency domain vectors with $Q_1(z)$ are $S_j^1$, $R_j^1$ and the windowed frequency domain vectors with $Q_2(z)$ are $S_j^2$, $R_j^2$. The transition frequency for $Q_1(z)$ is $f_{cutoff}$ and the pass band for $Q_2(z)$ is $f_{cutoff}$~8 kHz. A least-square solution $g_{gls}$ (e.g., global least square solution) is derived 1002 that maps SP $S_j^1$ to receiver-to-eardrum responses $R_j^1$ at low frequency region based on the least squares method in Expressions (1)-(3). The ensemble average $S_j^2$, $R_j^2$ of is calculated 1003 to get $S'_2$, $R'_2$ respectively.

The first n-principal components are extracted 1004 from the windowed frequency domain vectors $S_j^2$, $R_j^2$ by PCA to get $U_s$ and $U_r$ respectively. In the above example, n=12 principle components are extracted, although other values may be used. The principal component gain vectors $G_{r,j}$ are calculated 1005 according to $g_{r,j}=U_r^H(R_j^2-R'_2)$ and $g_{s,j}=U_s^H(S_j^2-S'_2)$. The ensemble average of $g_{s,j}$, $g_{r,j}$ are respectively calculated 1006 to get $g_s'$, $g'_r$, and the map a is found 1007 in the principal component domain according to Equation (3) below.

$$a = \underset{a}{\operatorname{argmin}}\sum_j \|(g_{r,j} - g_r') - a(g_{s,j} - g_s')\|^2 \quad (3)$$
$$= \sum_j (g_{r,j} - g_r')(g_{s,j} - g_s')^H\left(\sum_j (g_{s,j} - g_s')(g_{s,j} - g_s')^H + \mu I\right)^{-1}$$

Figure 13:
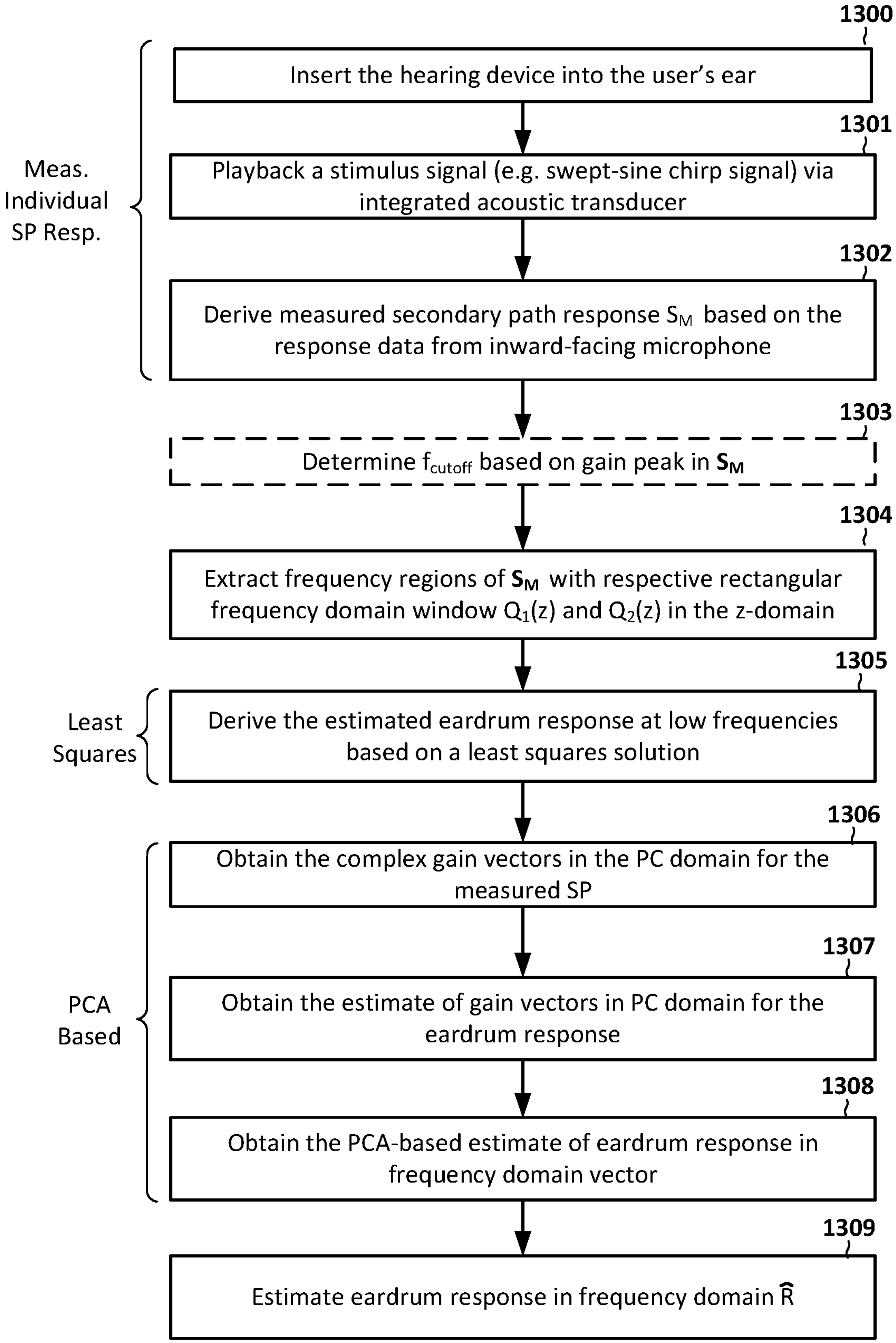
FIGS. 13 and 14 are flowcharts of methods according to example embodiments.

In FIG. 13, a flowchart shows a method of estimating the individual receiver-to-eardrum response. Blocks 1300-1302 describe measuring the individual secondary path response, which involves inserting 1300 the hearing device into the user's ear and playback 1301 of a stimulus signal (e.g. swept-sine chirp signal) via the integrated receiver. A measured secondary path response $S_M$ can be derived 1302 based on the response data from the inward-facing microphone. As indicated by block 1303, the cutoff frequency $f_{cutoff}$ may optionally be determined, e.g., as shown in FIG. 9. Otherwise, a predetermined $f_{cutoff}$ may be chosen, e.g., 1.5 kHz.

The frequency regions of $S_M$ are extracted 1304 with respective rectangular frequency domain window $Q_1(z)$ and $Q_2(z)$ in the z-domain. The windowed frequency domain vectors with $Q_1(z)$ are $S_M^1$ and the windowed frequency domain vectors with $Q_2(z)$ are $S_M^2$. The estimated eardrum response at low frequencies (at or below $f_{cutoff}$) is derived 1305 based on least squares solution by $\hat{R}_{GLS}=S_M^{1}\cdot{}^*g_{gls}$, where $g_{gls}$ is obtained from previously determined training data.

Blocks 1306-1308 relate to the PCA-based estimate of the eardrum response at high frequencies (above $f_{cutoff}$). This involves obtaining 1306 the complex gain vectors in PC domain for the measured SP: $\hat{g}_s=U_s^H(S_M^2-S'_2)$, where $U_s^H$ and $S'_2$ are obtained from the previously determined training data. The estimate of gain vectors in the PC domain for the eardrum response is obtained 1307 as $\hat{g}_r=g'_r+a\hat{g}_s$, where $g'_r$ and a are obtained from the previously determined training data. The PCA-based estimate of eardrum response in the frequency domain vector is obtained as $\hat{R}_{PCA}=R'_2+U_r\hat{g}_r$, where $R'_2$ and $U_r$ are obtained from the previously determined training data.

Based on these operations, the final estimate of eardrum response in frequency domain $\hat{R}$, is obtained 1309 as $\hat{R}=\hat{R}_{GLS}$, when frequency$\leq f_{cutoff}$, and $\hat{R}=\hat{R}_{PCA}$, when frequency$>f_{cutoff}$. These estimations can be used during operation of the hearing device, e.g., for example, one or more of insertion gain calculation, active noise cancellation, and occlusion control. The previously determined training data may be accessible by the hearing device for at least the operations in blocks 1304-1308, e.g., stored in local memory or stored in an external device that is coupled to the hearing device, e.g., a smartphone. In some embodiments, operations in some or all of blocks 1302-1308 may be performed by the external device and the results transferred to the hearing device.

Note that the PCA-based estimator is just one example of a reduced dimensionality estimator. A reduced dimensionality estimate may be alternatively determined by a deep encoder estimator (also sometimes referred to as an "autoencoder"), which reduces the dimensionality based on a machine learning structure such as a deep neural network. Replacement of the PCA-based estimator with a deep encoder estimator may change some aspects described above, such as the selection of the cutoff frequency. Generally, the deep encoder estimator data transferred from the training process will be a neural network that can take the windowed frequency domain vector S as input.

Figure 14:
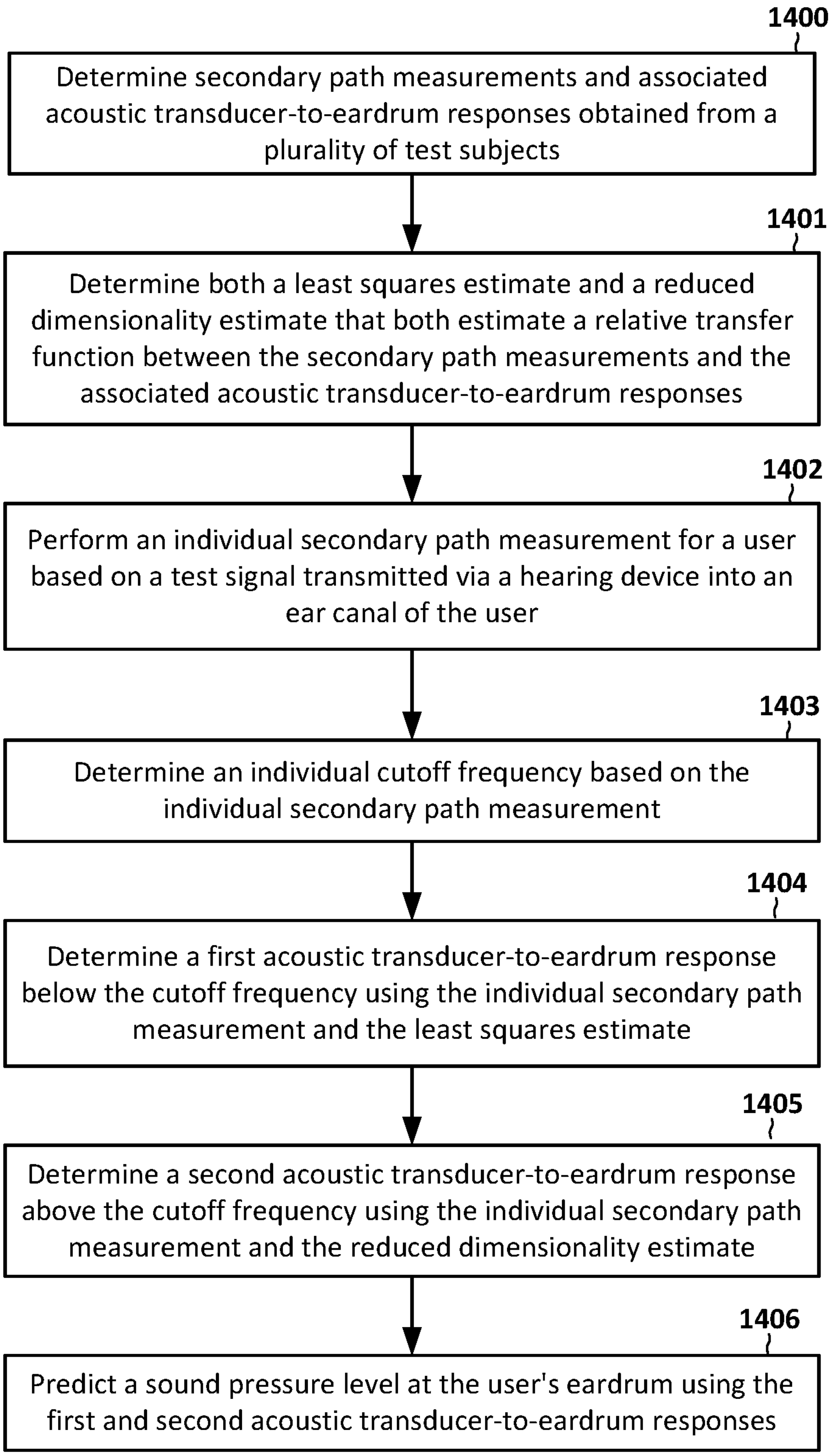

In FIG. 14, a flowchart shows a method according to another example embodiment. The method involves determining 1400 secondary path measurements and associated acoustic transducer-to-eardrum responses obtained from a plurality of test subjects. The method also involves determining 1401 both a) a least squares estimate and b) a reduced dimensionality estimate that both estimate a relative transfer function between the secondary path measurements and the associated acoustic transducer-to-eardrum responses.

An individual secondary path measurement is performed 1402 for a user based on a test signal transmitted via a hearing device into an ear canal of the user. An individual cutoff frequency is determined 1403 for the individual secondary path measurement. The cutoff frequency may be predetermined (e.g., a fixed value based on the training data) or selected based on the individual secondary path measurement.

A first acoustic transducer-to-eardrum response below the cutoff frequency is determined 1404 using the individual secondary path measurement and the least squares estimate. A second acoustic transducer-to-eardrum response above the cutoff frequency is determined 1405 using the individual secondary path measurement and the reduced dimensionality estimate. A sound pressure level is predicted at the user's eardrum using the first and second acoustic transducer-to-eardrum responses.

Figure 15:
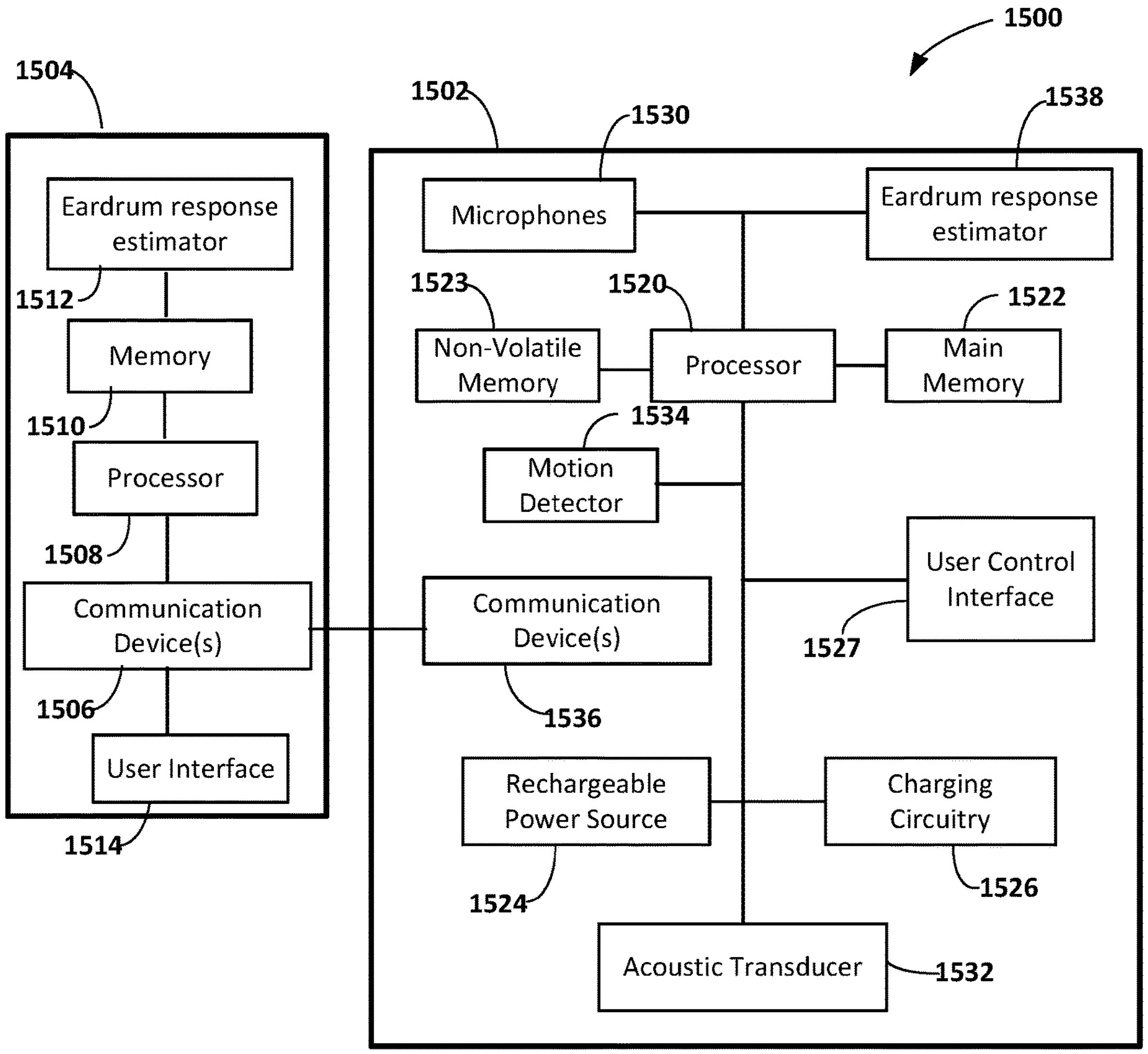
FIG. 15 is a block diagram of a hearing device according to an example embodiment.

In FIG. 15, a block diagram illustrates a system and ear-worn hearing device 1500 in accordance with any of the embodiments disclosed herein. The hearing device 1500 includes a housing 1502 configured to be worn in, on, or about an ear of a wearer. The hearing device 1500 shown in FIG. 15 can represent a single hearing device configured for monaural or single-ear operation or one of a pair of hearing devices configured for binaural or dual-ear operation. The hearing device 1500 shown in FIG. 15 includes a housing 1502 within or on which various components are situated or supported. The housing 1502 can be configured for deployment on a wearer's ear (e.g., a behind-the-ear device housing), within an ear canal of the wearer's ear (e.g., an in-the-ear, in-the-canal, invisible-in-canal, or completely-in-the-canal device housing) or both on and in a wearer's ear (e.g., a receiver-in-canal or receiver-in-the-ear device housing).

The hearing device 1500 includes a processor 1520 operatively coupled to a main memory 1522 and a non-volatile memory 1523. The processor 1520 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 1520 can include or be operatively coupled to main memory 1522, such as RAM (e.g., DRAM, SRAM). The processor 1520 can include or be operatively coupled to non-volatile (persistent) memory 1523, such as ROM, EPROM, EEPROM or flash memory. As will be described in detail hereinbelow, the non-volatile memory 1523 is configured to store instructions that facilitate using estimators for eardrum sound pressure based on SP measurements.

The hearing device 1500 includes an audio processing facility operably coupled to, or incorporating, the processor 1520. The audio processing facility includes audio signal processing circuitry (e.g., analog front-end, analog-to-digital converter, digital-to-analog converter, DSP, and various analog and digital filters), a microphone arrangement 1530, and an acoustic transducer 1532 (e.g., loudspeaker, receiver, bone conduction transducer). The microphone arrangement 1530 can include one or more discrete microphones or a microphone array(s) (e.g., configured for microphone array beamforming). Each of the microphones of the microphone arrangement 1530 can be situated at different locations of the housing 1502. It is understood that the term microphone used herein can refer to a single microphone or multiple microphones unless specified otherwise.

At least one of the microphones 1530 may be configured as a reference microphone producing a reference signal in response to external sound outside an ear canal of a user. Another of the microphones 1530 may be configured as an error microphone producing an error signal in response to sound inside of the ear canal. A physical propagation path between the reference microphone and the error microphone defines a primary path of the hearing device 1500. The acoustic transducer 1532 produces amplified sound inside of the ear canal. The amplified sound propagates over a secondary path to combine with direct noise at the ear canal, the summation of which is sensed by the error microphone.

The hearing device 1500 may also include a user interface with a user control interface 1527 operatively coupled to the processor 1520. The user control interface 1527 is configured to receive an input from the wearer of the hearing device 1500. The input from the wearer can be any type of user input, such as a touch input, a gesture input, or a voice input. The user control interface 1527 may be configured to receive an input from the wearer of the hearing device 1500.

The hearing device 1500 also includes an eardrum response estimator 1538 operably coupled to the processor 1520. The eardrum response estimator 1538 can be implemented in software, hardware, or a combination of hardware and software. The eardrum response estimator 1538 can be a component of, or integral to, the processor 1520 or another processor coupled to the processor 1520. The eardrum response estimator 1538 is operable to perform an initial setup as shown in blocks 1300-1302 of FIG. 13, and may also be operable to perform calculations in blocks 1302-1308. During operation of the hearing device 1500, the eardrum response estimator 1538 can be used to apply the eardrum response estimates over different frequency ranges as described above.

The hearing device 1500 can include one or more communication devices 1536. For example, the one or more communication devices 1536 can include one or more radios coupled to one or more antenna arrangements that conform to an IEEE 802.11 (e.g., Wi-Fi®) or Bluetooth® (e.g., BLE, Bluetooth® 4.2, 5.0, 5.1, 5.2 or later) specification, for example. In addition, or alternatively, the hearing device 1500 can include a near-field magnetic induction (NFMI) sensor (e.g., an NFMI transceiver coupled to a magnetic antenna) for effecting short-range communications (e.g., ear-to-ear communications, ear-to-kiosk communications). The communications device 1536 may also include wired communications, e.g., universal serial bus (USB) and the like.

The communication device 1536 is operable to allow the hearing device 1500 to communicate with an external computing device 1504, e.g., a smartphone, laptop computer, etc. The external computing device 1504 includes a communications device 1506 that is compatible with the communications device 1536 for point-to-point or network communications. The external computing device 1504 includes its own processor 1508 and memory 1510, the latter which may encompass both volatile and non-volatile memory. The external computing device 1504 includes an eardrum response estimator 1512 that may operate in cooperation with the eardrum response estimator 1538 of the hearing device 1538 to perform some or all of the operations described for the eardrum response estimator 1538. The estimators 1512, 1538 may adopt a protocol for the exchange of data, initiation of operations (e.g., playing of test signals via the acoustic transducer 1532), and communication of status to the user, e.g., via user interface 1514 of the external computing device 1504. Also, some portions of the data used in the estimations (e.g., least squares and reduced dimensionality estimates from secondary path measurements and associated receiver-to-eardrum responses that were measured from a plurality of test subjects) may be stored in one or both of the memories 1510, 1522, and 1523 of the devices 1504, 1500 during the estimation process.

The hearing device 1500 also includes a power source, which can be a conventional battery, a rechargeable battery (e.g., a lithium-ion battery), or a power source comprising a supercapacitor. In the embodiment shown in FIG. 5, the hearing device 1500 includes a rechargeable power source 1524 which is operably coupled to power management circuitry for supplying power to various components of the hearing device 1500. The rechargeable power source 1524 is coupled to charging circuitry 1526. The charging circuitry 1526 is electrically coupled to charging contacts on the housing 1502 which are configured to electrically couple to corresponding charging contacts of a charging unit when the hearing device 1500 is placed in the charging unit.

Figure 16:
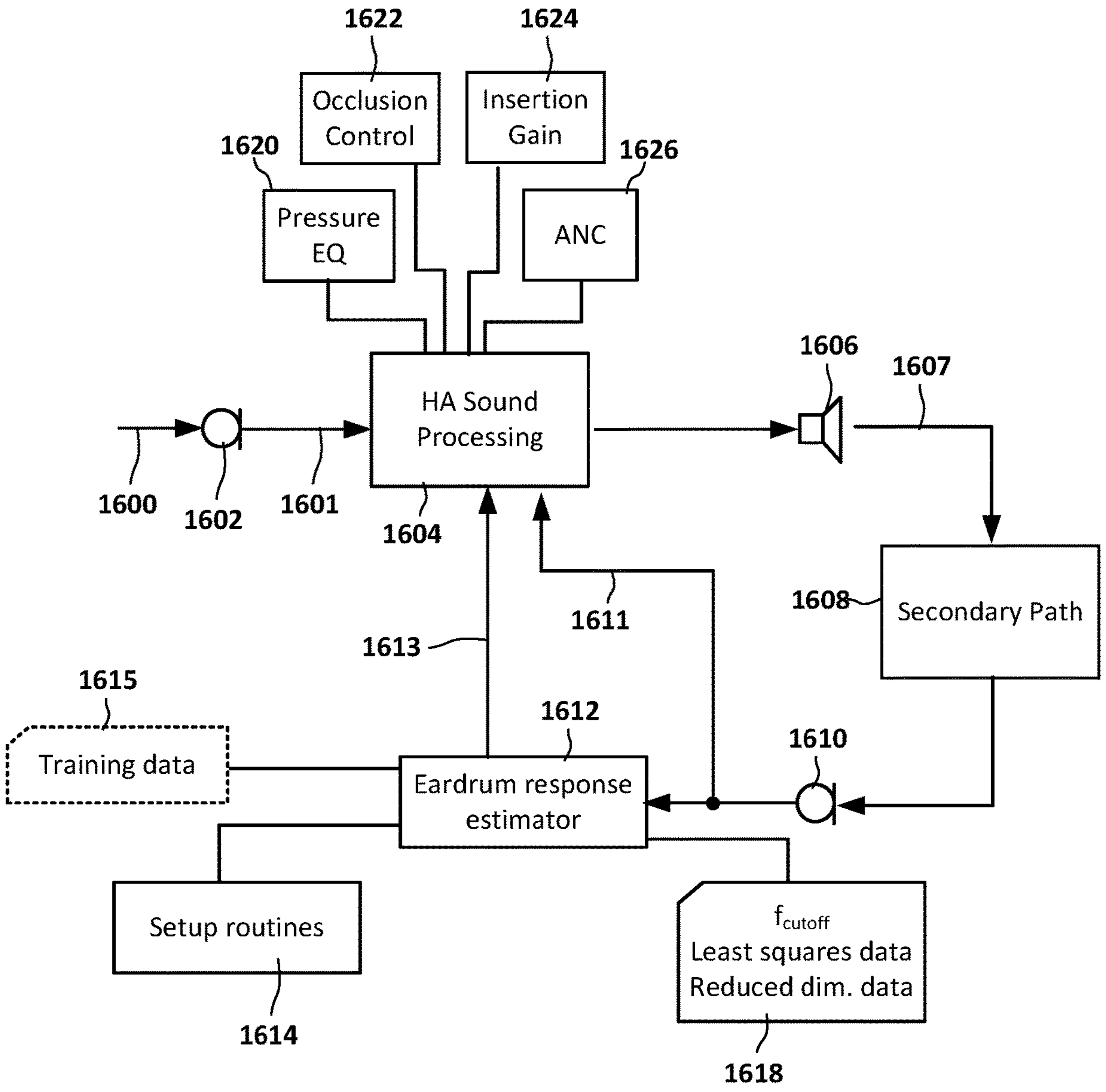
FIG. 16 is a block diagram of an audio processing path according to an example embodiment.

In FIG. 16, a block diagram shows an audio signal processing path according to an example embodiment. An external microphone 1602 receives external audio 1600 which is converted to an audio signal 1601. A hearing assistance (HA) sound processor 1604 which processes the audio signal 1601 which is output to an acoustic transducer 1606, which produces audio 1607 within the ear canal. The HA sound processor 1604 may perform, among other things, digital-to-analog conversion, analog-to-digital conversion, amplification, noise reduction, feedback suppression, voice enhancement, equalization, etc. An inward-facing microphone 1610 receives acoustic output 1607 of the acoustic transducer 1606 via a secondary path 1608, which includes physical properties of the acoustic transducer 1606, microphone 1610, housing structures in the ear, the shape and characteristics of the ear canal, etc.

The inward-facing microphone 1610 provides an audio signal 1611 that may be used by the HA processor 1604, which includes or is coupled to an eardrum response estimator 1612, which may operate locally (on the hearing device) or remotely (on a mobile device with a data link to the hearing device). The eardrum response estimator 1612 used to provide data 1613 to the HA sound processor 1604, such as a transfer function that can be used to determine an eardrum sound pressure level based on the audio signal 1611. Generally, the eardrum response estimator 1612 utilizes stored data 1618 that includes a cutoff frequency and data used to make a least squares estimate and a reduced dimensionality estimate as described above. This data 1618 is specific to an individual user, and may be determined during an initial fitting, and may also be subsequently measured for validation/update, e.g., the estimated eardrum pressure can be periodically updated or updated upon request by the user based on current measurements of the secondary path.

The eardrum response estimator 1612 may also perform setup routines 1614 that are used to derive the data 1618 based on a test signal transmitted through the acoustic transducer 1606 and training data 1615. Note that the training data 1615 need not be stored on the apparatus long-term, e.g., may be transferred in whole or in part for purposes of deriving the data 1618, or the processing may occur on another device, with just the derived individual data 1618 being transferred to the apparatus.

The data 1613 provided by the eardrum response estimator 1612 may be used by one or more functional modules of the HA processor 1604. An example of these modules is a pressure equalizer 1620, which can be used to determine eardrum pressure equalization for self-fitting of a hearing device. An occlusion control module 1622 can shape the output audio to help sound to be reproduced more accurately. An insertion gain module 1624 can be used to more accurately predict the actual gain of input sound 1600 to output sound 1607 as the latter is perceived at the eardrum. An active noise cancellation module 1626 can be used to reduce unwanted sounds (e.g., background noise) so that desired sounds (e.g., speech) can be more easily perceived by the user.

In summary, systems, methods, and apparatuses are described that estimate an individual receiver-to-eardrum response based on a measurement of the individual secondary path. The estimator features a combination of two different estimation schemes at low- and high-band frequencies. The cut-off frequency that separates the two estimations schemes for high/low frequency ranges is selected and it may vary among different subjects based on the individualized secondary path measurements. At low frequencies where the deterministic changes between secondary path and receiver-to-eardrum responses are not manifest, the estimated eardrum response is based on the global least-squares estimator that optimizes across a training dataset. At high frequencies, the estimated eardrum response is based on reduced dimensionality estimator that benefits from numerical robustness and reduced processing resources.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g., 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

The invention claimed is:

1. A method comprising:

determining a cutoff frequency for an individual based on a secondary path measurement performed on the individual;

estimating a first acoustic transducer-to-eardrum response below the cutoff frequency using the secondary path measurement and a least squares estimate;

estimating a second acoustic transducer-to-eardrum response above the cutoff frequency using the secondary path measurement and a reduced dimensionality estimate; and predicting a sound pressure level caused by the hearing device at an eardrum of the individual using the first and second acoustic transducer-to-eardrum responses.

2. The method of claim 1, wherein the least squares estimate and the reduced dimensionality estimate are obtained from a training dataset obtained by measuring responses of a plurality of test subjects that are fitted with a corresponding type or model of the hearing device.

3. The method of claim 2, further comprising using the predicted sound pressure level at the eardrum of the individual to determine eardrum pressure equalization for self-fitting of the hearing device.

4. The method of claim 1, further comprising using the predicted sound pressure level at the eardrum of the individual for insertion gain calculation by the hearing device.

5. The method of claim 1, further comprising using the predicted sound pressure level at the eardrum of the individual for active noise cancellation by the hearing device.

6. The method of claim 1, further comprising using the predicted sound pressure level at the eardrum of the individual for occlusion control.

7. The method of claim 1, wherein the reduced dimensionality estimate comprises a principal component analysis (PCA)-based estimate.

8. The method of claim 7, wherein using the reduced dimensionality estimate comprises:

obtaining probe tube measurements of ear drum sound pressure from a plurality of test subject to form a training dataset; and adjusting the probe tube measurements using a modeled pressure transfer function before obtaining the PCA-based estimate.

9. The method of claim 8, wherein the modeled pressure transfer function uses a lossless cylinder model.

10. A computer memory storing instructions operable by a processor of the hearing device of claim 1, the instructions operable to cause the processor to perform the method of claim 1.

11. A hearing device operable to be fitted into an ear canal of an individual, comprising:

a memory configured to store:

a least squares estimate and a reduced dimensionality estimate that both estimate acoustic transducer-to-eardrum responses of the hearing device; and a cutoff frequency for the individual based on a secondary path measurement performed on the individual;

an inward-facing microphone configured to receive internal sound inside of the ear canal;

an acoustic transducer configured to produce amplified sound inside of the ear canal;

a processor coupled to the memory, the inward-facing microphone, and the acoustic transducer, the processor operable via instructions to:

estimate a first acoustic transducer-to-eardrum response below the cutoff frequency using the secondary path measurement and the least squares estimate;

estimate a second acoustic transducer-to-eardrum response above the cutoff frequency using the secondary path measurement and the reduced dimensionality estimate; and predict a sound pressure level caused by the hearing device at an eardrum of the individual using the first and second acoustic transducer-to-eardrum responses.

12. The hearing device of claim 11, wherein the least squares estimate and the reduced dimensionality estimate are obtained from a training dataset that is obtained by measuring responses of a plurality of test subjects that are fitted with a corresponding type or model of the hearing device.

13. The hearing device of claim 12, wherein the processor is further operable to use the predicted sound pressure level at the eardrum of the individual to determine eardrum pressure equalization for self-fitting of the hearing device.

14. The hearing device of claim 11, wherein the processor is further operable to use the predicted sound pressure level at the eardrum of the individual for insertion gain calculation by the hearing device.

15. The hearing device of claim 11, wherein the processor is further operable to use the predicted sound pressure level at the eardrum of the individual for active noise cancellation by the hearing device.

16. The hearing device of claim 11, wherein the processor is further operable to use the predicted sound pressure level at the eardrum of the individual for occlusion control.

17. The hearing device of claim 11, wherein the reduced dimensionality estimate comprises a principal component analysis (PCA)-based estimate.

18. The hearing device of claim 11, wherein the processor is further operable to perform the individual secondary path measurement for the individual based on a test signal transmitted into the ear canal via the acoustic transducer and measured via the inward-facing microphone.

19. The hearing device of claim 18, wherein the individual secondary path measurement is made periodically to periodically update the first and second acoustic transducer-to-eardrum responses.

20. The hearing device of claim 18, wherein the individual secondary path measurement is made in response to a user request to update the first and second acoustic transducer-to-eardrum responses.

* * * * *